(12) United States Patent
Chen et al.

(10) Patent No.: US 8,815,343 B2
(45) Date of Patent: Aug. 26, 2014

(54) HIGHLY CONDUCTIVE AND STABLE TRANSPARENT CONDUCTING POLYMER FILMS

(75) Inventors: Lichun Chen, Linkoping (SE); Donal Donat Conor Bradley, London (GB)

(73) Assignee: Imperial Innovation Limited, London (GB)

( * ) Notice: Subject to any disclaimer, the term of this patent is extended or adjusted under 35 U.S.C. 154(b) by 564 days.

(21) Appl. No.: 12/683,845

(22) Filed: Jan. 7, 2010

(65) Prior Publication Data

US 2010/0163808 A1 Jul. 1, 2010

Related U.S. Application Data

(63) Continuation of application No. PCT/EP2008/058832, filed on Jul. 8, 2008.

(30) Foreign Application Priority Data

Jul. 9, 2007 (GB) .................................. 0713304.4

(51) Int. Cl.
*C23C 16/00* (2006.01)

(52) U.S. Cl.
USPC ................... 427/255.28; 427/58; 427/255.11; 427/255.14; 427/255.6; 427/372.2; 427/384; 252/500

(58) Field of Classification Search
USPC .................. 252/500; 428/407; 526/256, 260; 427/58, 255.11, 255.14, 255.28, 255.6, 427/372.2, 384
See application file for complete search history.

(56) References Cited

U.S. PATENT DOCUMENTS

| | | | | |
|---|---|---|---|---|
| 6,664,355 B2 * | 12/2003 | Kim et al. | ...................... | 526/256 |
| 2003/0045663 A1 * | 3/2003 | Kim et al. | ...................... | 526/256 |
| 2007/0071987 A1 * | 3/2007 | Winther-Jensen | ......... | 428/474.4 |

FOREIGN PATENT DOCUMENTS

| | | |
|---|---|---|
| GB | 2169608 | 7/1986 |
| JP | 64-012514 A1 | 1/1989 |
| JP | 10-53651 A1 | 2/1998 |
| JP | 2006-231317 A1 | 7/2006 |
| WO | 2005/103109 A1 | 11/2005 |

OTHER PUBLICATIONS

'Stuffed' conducting polymers, Winther-Jensen et al., Polymer 46, 2004, 4664-4669.*
PEDOT/SSS: synthesis, characterization, properties and applications, Louwet et al., Synthesis metals 135-136, 2003, 115-117.*
Moisture Barrier Films Deposited on PET by ICPECVD of SiN, Wolf et al., Plasma Process. Polymer, 4, 2007, S185-S189.*
Huang, Jingsong et al., "Investigation of the Effects of Doping and Post-Deposition Treatments on the Donductivity, Morphology, and Work Function of Poly(3,4-ethylenedioxythiophene)/Poly(styrene sulfonate) Films," Adv. Funct. Mater., vol. 15(2):290-296 (2005).
Joensson, S.K.M. et al., "The effects of solvents on the morphology and sheet resistance in poly(3,4-ethylenedioxythiophene)-polystyrenesulfonic acid (PEDOT-PSS) films," Synthetic Metals, vol. 139:1-10 (2003).
Kim, Jinyeol et al., "The preparation and characteristics of conductive poly(3,4-ethylenedioxythiophene) thin film by vapor-phase polymerization," Synthetic Metals, vol. 139:485-489 (2003).
Ouyang, Jianyong et al., "On the mechanism of conductivity enhancement in poly(3,4-ethylenedioxythiophene):poly (styrene sulfonate) film through solvent treatment," Polymer, vol. 45:8443-8450 (2004).
Winther-Jensen, Bjorn et al., "Vapor-Phase Polymerization of 3,4-Ethylenedioxythiophene: A Route to Highly Conducting Polymer Surface Layers," Macromolecules, vol. 37:4538-4543 (2004).
Winther-Jensen, Bjorn et al., "Vapor-Phase Polymerization of Pyrrole and Thiophene Using Iron(III) Sulfonates as Oxidizing Agents," Macromolecules, vol. 37(16):5930-5935 (2004).
English Translation of JP Patent Publication 64-012514. Dated Jan. 17, 1989.
English Translation of JP Patent Publication 2006-231317. Dated Sep. 7, 2006.
English Translation of JP Patent Publication 10-053651. Dated Feb. 24, 1998.

* cited by examiner

*Primary Examiner* — Mark Kopec
*Assistant Examiner* — Haidung Nguyen
(74) *Attorney, Agent, or Firm* — Lathrop & Gage LLP; Brian C. Trinque

(57) ABSTRACT

The invention relates to a process for the synthesis of conducting polymer films by vapor phase polymerization. The invention relates particularly to the synthesis of polymerized thiophene films, for example poly(3,4-ethylenedioxythiophene) (PEDOT) films.

41 Claims, 2 Drawing Sheets

Highly Conductive and Stable Transparent Conducting Polymer Films

RELATED APPLICATIONS

This application is a continuation of International Application No. PCT/EP2008/058832, filed Jul. 8, 2008, which claims priority to United Kingdom Application No. 0713304.4, filed Jul. 9, 2007, which are incorporated herein by reference in their entirety. Additionally, the contents of any patents, patent applications, and references cited throughout this specification are hereby incorporated by reference in their entireties.

TECHNICAL FIELD

The present invention relates to a process for the synthesis of conducting polymer films formed by polymerization of a heteroaromatic molecule. The invention relates particularly to the synthesis of polymerized thiophene films, for example poly(3,4-ethylenedioxythiophene) (PEDOT) films.

BACKGROUND

Development of materials for use as electrodes in optoelectronic devices, such as field effect transistors (FETs), light emitting diodes, photovoltaic devices (PVDs) and solar cells is an area of huge research interest. Traditionally, widely used electrode materials have been indium-tin-oxide (ITO) as a transparent front electrode with a metal, such as aluminium, barium, calcium, gold and the like, as a back electrode. However, ITO suffers from cracking and loss in conductivity when deposited on flexible substrates and subjected to bending. Furthermore, the fast development of the optoelectronic display industry has dramatically pushed up the price of indium, the raw material for the production of ITO electrodes. Alternatives to inorganic electrode materials such as ITO are urgently needed.

The provision of flexible electrode materials to address problems of cracking and consequent loss in conductivity seen with ITO electrodes is of great importance. Conducting polymer thin films are seen as an attractive alternative. Rapidly growing interest in polymer electronics has arisen from the promise of attaining lightweight, flexible electronic components that can be manufactured at low cost.

In recent years, poly(3,4-ethylenedioxythiophene) (PEDOT) has emerged as an excellent candidate material for flexible polymer electronics. PEDOT is a conducting polymer which has good stability and optical transparency in its conducting state. PEDOT itself is insoluble, but synthesis in the presence of the water soluble electrolyte poly(styrene sulfonic acid) (PSS), allows a stable PEDOT-PSS suspension to be formed that shows good film forming properties. When subjected to special treatment, such as secondary doping with glycerol or ethylene glycol, PEDOT-PSS films can have a conductivity which reaches 160 S/cm. This conductivity is, however, still far from the conductivity (in the region of 4000 S/cm) seen for ITO. PEDOT-PSS films are described in Jonsson, S. K. M., et al., Synthetic Metals, 2003. 139(1): 1-10, J, Huang., et al., Advanced Functional Materials, 2005. 15(2): 290-296 and J, Ouyang., et al., Polymer, 2004. 45(25): 8443-8450.

In order to seek further improvement in conductivity, chemical synthesis of PEDOT conducting polymer films has been widely investigated. Vapour phase polymerized PEDOT (VPP-PEDOT) films are particularly attractive, providing higher conductivity and transmission than PEDOT-PSS films. VPP-PEDOT synthesis is described in Jinyeol, K., et al. Synthetic Metals, 2003. 139(2): 485-489, Winther-Jensen, B., et al., Macromolecules 2004. 37(16): 5930-5935 and Winther-Jensen, B. and West, K.2004. Macromolecules 37(12): 4538-4543 and in WO2005/103109.

The polymerization process which leads to the formation of PEDOT involves (1) the oxidation of a 3,4-ethylenedioxythiophene (EDOT) monomer when an electron is withdrawn from an EDOT heteroaromatic ring, (2) the combination of two oxidized monomers to form a dimer with release of a proton, and (3) further oxidation of dimers and formation of trimers, etc, until long PEDOT chains are formed. The ionization potential of EDOT monomers and PEDOT dimers, trimers and infinite long chains are 1.1, 0.46. 0.16 and −0.25V (vs Ag/Ag+), respectively. Consequently, as soon as oligomers are formed, polymerization accelerates rapidly.

Existing VPP-PEDOT synthetic routes comprise three key steps: oxidant deposition, monomer polymerization and residual oxidant removal. Firstly, an oxidant layer is deposited on a substrate, generally glass or plastic, by spin coating or by gravure or screen printing methods carried out with a solution of an oxidant and an amine or amide polymerization inhibitor in an organic solvent. Following drying by heating, the substrate bearing an oxidant layer is transferred into a reaction chamber. The substrate bearing an oxidant layer is exposed to vapourized EDOT monomer in the reaction chamber. Polymerization takes place as the EDOT monomer vapour contacts the oxidant layer on the substrate, thereby forming a PEDOT film on the substrate surface. After the polymer film has formed, the substrate bearing a PEDOT film is washed to remove residual oxidant and any remaining polymerization inhibitor. Generally this washing is carried out with ethanol or methanol.

There are, however, several disadvantages to the existing VPP-PEDOT synthesis route described above. First, the PEDOT film synthesized on contact of the vapourized EDOT monomer with the oxidant layer has weak adhesion to the surface of the substrate. Thus, the PEDOT film easily loses contact with the substrate during the washing step. As a result of this, wrinkles may occur in the VPP-PEDOT film or the whole VPP-PEDOT film may peel off from the substrate into the wash solution. Second, due to the weak adhesion described above, it is not possible to thoroughly wash the VPP-PEDOT film and it is difficult to ensure complete removal of oxidant. This can cause problems with film morphology and may cause other problems when the film is used as an electrode. For example, the residual oxidant can crystallize as the temperature increases and cause deformation of the VPP-PEDOT film. The oxidant is also chemically reactive and therefore may cause degradation of the conjugated polymers, oligomers, dendrimer or other molecules to be used as the active layer in plastic electronic devices. Third, existing VPP-PEDOT synthetic routes generally require a large amount of organic solvent in the washing (oxidant removal) step. This is neither cost effective, nor environmentally friendly.

In order to obtain a VPP-PEDOT film with a smooth surface by using existing synthetic routes, it is necessary to immerse the substrate bearing a PEDOT film in organic solvent for a long time and use a large amount of solvent to wash the surface. The substrate must be handled with great care. Any quick movement of the substrate in the washing solvent may induce the tearing of the VPP-PEDOT film, or peeling off of the entire film into the solvent. In general, film morphology is sacrificed to ensure that the PEDOT film is maintained intact on the substrate.

SUMMARY OF THE INVENTION

The present invention provides a new VPP synthetic route for polymerised thiophene films which addresses the problems of existing synthetic routes. The films prepared by the new synthetic route are very smooth, and the whole synthetic route is easily controlled and suitable for production of large area films. The synthetic route can also be used for the synthesis of polymers from related heteroaromatic monomers, for example where the thiophene S atom is replaced by Se (selenophene), nitrogen (pyrrole), O (furan), or

The first aspect of the invention therefore relates to a process for the production of a polymer film by vapour phase polymerization (VPP), the process comprising the steps of:
(1) providing a solution comprising an oxidant, an amine or amide polymerisation inhibitor and an additive, wherein the additive is a water soluble polymer;
(2) applying the solution to a surface of a substrate so as to form an oxidant, polymerisation inhibitor and additive mixture layer on the surface of the substrate;
(3) exposing the oxidant, polymerization inhibitor and additive containing layer to a vapourized heteroaromatic monomer and allowing polymerization to proceed to form a polymer film on the surface of the substrate.

In a preferred embodiment, the solution comprising an oxidant, an amine or amide polymerisation inhibitor and an additive is an aqueous solution.

In a preferred embodiment, following step (2), the process further comprises the step (2a) of removing solvents from the oxidant, polymerisation inhibitor and additive mixture layer. Preferably, solvents are removed by heating. Preferably, the substrate is heated at 80-120° C. for 1-5 min (e.g. on a hot plate) in a dry atmosphere or under vacuum.

Removal of solvents prior to polymerisation step (3) improves film morphology and reduces the risk of the polymerised film being lifted from the substrate.

In a preferred embodiment, polymerization step (3) is carried out at a temperature in the range from 40° C. to 3° C. Preferably, polymerization is carried out in a dry chamber. Preferably, the reaction chamber is dried by heating and/or purging with nitrogen, argon or dry air.

The oxidant, polymerisation inhibitor and additive-containing layer are heated in a dry atmosphere or in vacuum in step (2a), and the polymerization chamber is dried in step (3) to avoid the effect of water on polymerization. Removing water from the polymerization reaction leads to the production of a polymer film with improved surface morphology.

In a preferred embodiment, the process further comprises step (4) of washing the substrate bearing a polymer film as produced in step (3) with water or an aqueous or water miscible solvent. The purpose of this step is to remove remaining oxidant and polymerization inhibitor. Preferably, step (4) comprises heating the substrate (for example by transferring the substrate onto a hot plate for a short period of time, preferably between 1 and 10 minutes) in an inert atmosphere, then immersing the substrate in water or an aqueous solvent for a certain time and finally taking the substrate bearing a polymer film out of the solvent, and allowing it to dry. Preferably, drying is allowed to occur naturally in air or under another suitable atmosphere (e.g. an inert atmosphere).

In a further preferred embodiment, the process further comprises step (5) of depositing a layer of polymeric acid onto the polymerized film. Preferably, this is achieved by spin coating with a solution of polymeric acid. This polymer acid layer helps to stabilise the conductivity of the film during subsequent annealing. Preferably, the polymeric acid is a water soluble polymeric acid dissolved in water to produce the polymeric acid solution. More preferably, the polymeric acid is poly (4-styrene sulfonic acid) (PSSA), poly(2-acrylamido-2-methyl-1-propanesulfonic acid) (PAAMPSA) or poly(3,4-ethylenedioxythiophene) doped with poly(4-styrenesulfonate) (PEDOT-PSS). Most preferably, the polymeric acid is PSSA.

In a preferred embodiment, the additive is a water soluble polymer selected from polyethylene oxide (PEO), polyvinyl alcohol (PVA), polyacrylamide, carboxymethylcellulose, hydroxyethylcellulose and a mixture of polymers comprising at least one, preferably two, of the listed polymers. Preferably, the additive is polyethylene oxide (PEO) or polyvinyl alcohol (PVA).

In a preferred embodiment, the polymer film comprises a polymer of a monomer of any of formulae I to V

(I)

(II)

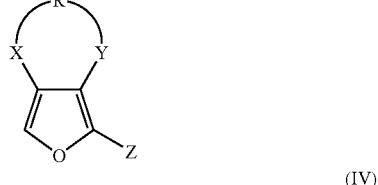

(III)

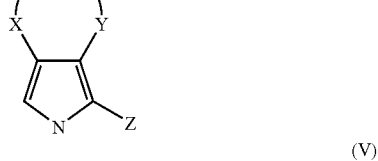

(IV)

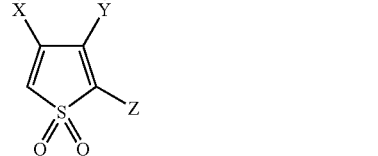

(V)

wherein X and Y may be, independently, —O— or —CH$_2$—, with the proviso that at least one of X and Y is —O—; R is optionally substituted $C_{1-4}$ alkyl; and Z is hydrogen or $NH_2$. Preferably, X and Y are both —O—. Preferably, Z is hydrogen.

Preferably, R is an optionally substituted $C_{1-4}$ alkylene biradical, selected from, for example, —$CH_2$—, —$CH_2CH_2$—, —$CH_2CH_2CH_2$— and —$CH_2CH_2CH_2CH_2$—, wherein in R, if substituted, one or more hydrogen, preferably one, two or three hydrogen atoms are replaced with a substituent selected independently from hydroxy, $C_{1-6}$alkyl, $C_{1-6}$haloalkyl, $C_{1-6}$ alkoxy, $C_{1-6}$-alkoxycarbonyl, $C_{1-6}$-alkylcarbonyl, formyl, aryl, amino, $C_{1-6}$alkylamino, di($C_{1-6}$alkyl)amino, carbamoyl, mono- and di($C_{1-6}$alkyl)amino-$C_{1-6}$-alkyl-amino-carbanoyl, $C_{1-6}$alkylcarbonylamino, —CN, carbamido, $C_{1-6}$alkanoyloxy, —$SO_3H$, —$SO_2H$, $C_{1-6}$-alkylsulphonyloxy, $C_{1-6}$-alkylsulphonyl, nitro and halogen. Preferred substituents are hydroxy, $C_{1-6}$alkyl, $C_{1-6}$ alkoxy, $C_{1-6}$-alkoxycarbonyl, $C_{1-6}$-alkylcarbonyl amino, $C_{1-6}$alkylamino, di($C_{1-6}$alkyl)amino and halogen. More preferably, R is an unsubstituted ethylene or propylene biradical (—$CH_2CH_2$— or —$CH_2CH_2CH_2$—)

Most preferably, R is unsubstituted ethylene (—$CH_2CH_2$—) and both X and Y are —O—, such that the monomer is ethylenedioxythiophene (EDOT) and the thiophene polymer is poly(3,4-ethylenedioxythiophene) (PEDOT).

In a preferred embodiment, the oxidant is an Iron (III) salt, preferably an Fe (III) sulphonate, Fe (III) chloride or an Fe(III) phosphate, more preferably the oxidant is iron p-toluenesulfonate heptanedionate.

In a preferred embodiment the ratio (calculated by weight) between the oxidant and the additive in the oxidant solution is in the range between 1:0.006 and 1:0.92. More preferably, the additive is PVA and the ratio between oxidant and PVA is in the range between 1:0.042 and 1:0.92 or the additive is PEO and the ratio between oxidant and PEO is in the range between 1:0.23 and 1:0.92.

In a preferred embodiment, the additive is PVA and the molecular weight of PVA is at least 1000-14000, and more preferably at least 7000-10000. In another preferred embodiment, the additive is PEO and the molecular weight of PEO is at least 1000, and more preferably at least 6400.

In a preferred embodiment the amine or amide polymerization inhibitor is a tertiary amine, a tertiary amide or an aromatic amine. Preferably, the inhibitor is a cyclic tertiary amine (such as 4-methylmorpholine, 1-methyl piperidine and 1-methylpyrrolidine), a cyclic tertiary amide (such as N-methyl-pyrrolidone, N-vinyl-pyrrolidone and 3-methyl-2-oxozolidinone) or an aromatic amine (such as pyridine, N-methyl-imidazole, quinoline and isoquinoline). The oxidant solution may comprise a mixture of amines and/or amides. Most preferably the inhibitor is pyridine.

In a preferred embodiment, the substrate comprises a polymeric plastic material, a metal foil or glass. The polymeric plastic material is preferably selected from polyolefins such as polyethylene, polyethylene terephthalate (PET), polyethylene naphthalate (PEN) and polypropylene, polystyrene, thermoplastics, fluoro-polymers such as polytetrafluoroethylene, tertafluoroethylene-hexafluoropropylene copolymers and poly-vinyl-difluoride, polyamides such as Nylon® and polyvinylchloride.

In a preferred embodiment, a plastic film substrate comprising multilayer barriers (such as SiOx and SiNx, wherein 2>x>1 and 1.3>y>0.6) may be used. The barriers are used to limit oxygen and water penetration through the plastic film and also to planarize its surface.

In a preferred embodiment of the invention, in step (3) the substrate bearing an oxidant, polymerisation inhibitor and additive-containing layer is exposed to vaporised heteroaromaticmonomer (preferably EDOT monomer) in an in vacuo reaction chamber. Preferably, the vacuum in the reaction chamber is from 210 to 0.1 ton, more preferably, the vacuum is 75 torr. Preferably, liquid heteroaromatic monomer is introduced into the vacuum by pre-application on a substrate (eg glass) in the chamber or by injection into the reaction chamber. The vacuum causes the liquid monomer to vaporise.

In an alternative embodiment of the invention, in step (3) the substrate bearing an oxidant, polymerisation inhibitor and additive-containing layer is exposed to vaporized heteroaromatic monomer (preferably EDOT monomer) brought into the reaction chamber by flowing $N_2$, Ar or dry air over liquid heteroaromatic monomer held in a container within a sealed path between the gas source and the chamber.

In a preferred embodiment, polymerisation step (4) is carried out at a temperature below 40° C. Preferably, the temperature is 30° C. or below, 22° C. or below or 8° C. or below. More preferably, the temperature is 3-30° C., 3-26° C., 3-22° C. or 3-8° C. It has been found that carrying out low temperature VPP of a polymerised heteroaromatic film as set out above leads to the production of a thiophene film with increased conductivity.

In a preferred embodiment, the solution comprising an oxidant, a polymerisation inhibitor and an additive is an aqueous solution comprising a mixture of solvents, namely water and a water miscible solvent, for example an alcohol, such as methanol, ethanol or butanol.

In an alternative embodiment, the oxidant, amine or amide polymerisation inhibitor and an additive are dissolved in a mixture of toluene and an alcohol solvent such as methanol, ethanol or butanol. It should be noted that the water soluble polymer additive may be solubilised in an alcohol solvent.

In a preferred embodiment, the solution comprising an oxidant, a polymerisation inhibitor and an additive is prepared by preparing a first solution comprising the oxidant and polymerisation inhibitor and a second solution comprising the additive and then mixing the first and second solutions. The first and second solutions may comprise the same or different solvents.

In another preferred embodiment glycol or glycerol is added to the oxidant solution to increase the adhesion on the polymerised film to the substrate.

The process described above is robust and enables the production of smooth and highly conductive VPP-PEDOT films at a high yield. The VPP-PEDOT film produced by the process has good substrate adhesion. This allows for thorough washing in water, without wrinkling or film detachment, improving film morphology and yield.

In a second aspect, the invention provides a polymer film produced by a process according to the first aspect of the invention. Preferred features of the first aspect apply to the second aspect of the invention.

The invention may be put into practice in various ways and a number of specific embodiments will be described by way of example to illustrate the invention with reference to the accompanying figures, in which:

DETAILED DESCRIPTION OF THE INVENTION

Figure 1:
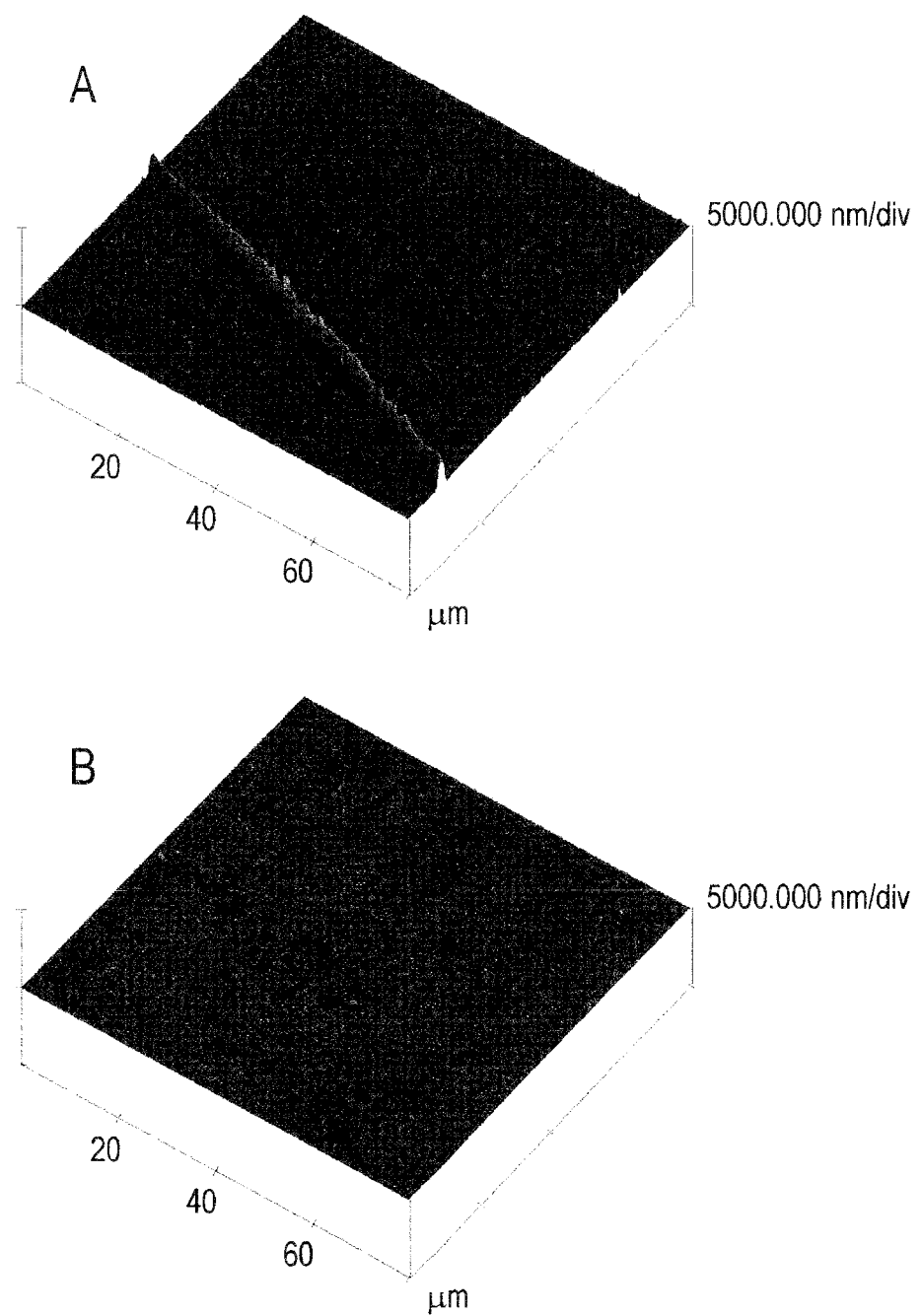
FIG. 1A shows a three dimensional AFM image of a VPP-PEDOT film without the polymer additive, wherein a fold has formed.
FIG. 1B shows an AFM image of VPP-PEDOT growth on the layer deposited from solution with iron p-toluenesulfonate heptanedionate:PVA 1:0.085, as shown in solution table 1.

The invention will now be illustrated by reference to the following non-limiting examples.

EXAMPLES

The raw materials for VPP-PEDOT synthesis are EDOT monomer (Baytron M from H. C. Stark), Iron p-toluenesulfonate heptanedionate, pyridine, glycerol, polyethylene oxide (PEO, Mw 6400), polyvinyl alcohol (PVA, Mw 7000-10000), methanol and ethanol from Sigma-Aldrich. These raw materials were obtained commercially and used with no further purification. Glass substrates were cleaned by using 20% Decon 90 and deionised (DI) water in an ultrasonic bath for 30 minutes, respectively.

As an alternative to glass, metal foils or plastic substrates can be used, cleaned prior to use, for example with ethanol solution for 10 minutes in an ultrasonic bath.

Example 1

Comparison of VPP-PEDOT Produced with and without Polymer Additives

VPP_PEDOT Production a Method for Mass Production Using PVA/PEO Additives Solution Preparation Aqueous solutions comprising an oxidant, a polymerization inhibitor and a polymeric additive were prepared by first preparing an oxidant solution and an additive solution and then combining these solutions. Oxidant solution (1), for use with PVA, was produced by dissolving 6 g Iron p-toluenesulfonate heptanedionate, 0.2 g pyridine, 0.8 g glycerol in 30 g iso-propanol. Oxidant solution (2), for use with PEO, was made by replacing the iso-propanol with DI water and keeping the other materials in the same amount as in solution (1). Glycerol is a viscous, water-miscible solvent which is included to tailor the viscosity of the oxidant solution. A PVA solution was made by dissolving 0.5 g PVA in 3 g DI water and a PEO solution by dissolving 0.6 g PEO in 3 g DI water. The solutions were stirred for several hours on a hot plate at 80° C. and filtered through 0.2 micrometer filters. Oxidant solutions containing different concentrations of PVA and PEO additive were prepared by mixing the substances described above in the ratios listed in the following tables.

TABLE 1 solutions with PVA additive

| | Iron p-toluenesulfonate heptanedionate/PVA | | | | | | |
|---|---|---|---|---|---|---|---|
| | 1:0.00 | 1:0.006 | 1:0.012 | 1:0.042 | 1:0.085 | 1:0.12 | 1:0.37 |
| Oxidant solution (1) | 0.5 g | 0.5 g | 0.5 g | 0.5 g | 0.5 g | 0.5 g | 0.5 g |
| PVA solution | 0.0 g | 0.006 g | 0.013 g | 0.03 | 0.06 | 0.09 | 0.26 g |
| Extra DI water | 0.0 g | 0.06 g | 0.06 g | 0.0 g | 0.0 g | 0.0 g | 0.0 g |

TABLE 2 solutions with PEO additives

| | Iron p-toluenesulfonate heptanedionate/PEO | | | |
|---|---|---|---|---|
| | 1:0.23 | 1:0.46 | 1:0.69 | 1:0.92 |
| Oxidant solution (2) | 3 g | 3 g | 3 g | 3 g |
| PEO solution | 0.1 g | 0.2 g | 0.3 g | 0.4 g |

VPP-PEDOT with polymer additive films were prepared through depositing oxidant, pyridine and PVA (or PEO) mixture on glass substrates by spin coating from the above solutions. This was followed by a drying step at 80-120° C. on a hot plate for 5 min in nitrogen atmosphere. Then the substrates were transferred into a vacuum reaction chamber, containing a piece of cleaned glass on which a few drops of EDOT liquid monomer had been placed. Any water absorbed inside the chamber, on the surface of the chamber walls was pre-removed by heat and $N_2$ purge. The vacuum was typically 75 torr and the temperature 20° C.

As the EDOT monomer contacted the oxidant layer, polymerization occurred and a PEDOT film formed on the substrate surface. This was monitored by appearance of the characteristic light blue colour of the PEDOT film. Then the substrates bearing a PEDOT film were transferred from the vacuum chamber onto a hot plate at 50° C. for 30 minutes in a nitrogen atmosphere. This heating acts to aid polymerisation of any monomer remaining in the film layer, and the nitrogen atmosphere is to avoid water absorption in the polymerized film and avoid hole formation. After the heating step, the substrate bearing a PEDOT film was immersed in DI water. The substrates bearing VPP-PEDOT films with PVA or PEO additives were agitated vigorously in order to aid oxidant removal, whilst leaving the VPP-PEDOT film intact on the substrate.

Preparation of VPP-PEDOT Film Using a Known Synthetic Route

For purposes of comparison, VPP-PEDOT films were prepared using a known synthetic route.

(1) Deposition of Oxidant Layer on a Glass Substrate

An oxidant solution was produced by dissolving 0.6 g Iron p-toluenesulfonate heptanedionate and 0.02 g pyridine in 3 g butanol (or butanol and toluene mixture solution with ratio 1:1), and stirring for one hour on a 80° C. hot plate. The oxidant (iron p-toluenesulfonate) layer was deposited on a glass substrate by spin coating. Drying was carried out by heating to 80-100° C.

(2) Polymerization

The substrate bearing an oxidant layer was transferred into a reaction chamber under vacuum. The substrate bearing an oxidant layer was exposed to vapourized EDOT monomer in the reaction chamber. Polymerization takes place as the EDOT monomer vapour contacts the oxidant layer on the substrate, thereby forming a PEDOT film on the substrate surface.

(3) Oxidant By-Product Removal

The substrate bearing a PEDOT film was transferred from the vacuum chamber onto a hot plate at 50° C. for 30 minutes, and then immersed in ethanol/methanol (1:1) solution for 3 hours. Then the substrate with PEDOT film on top was slowly moved out of the solution, and allowed to dry naturally in air. The substrate with a VPP-PEDOT film was gently washed to avoid the whole film peeling off.

During the known synthetic process, the oxidant-containing layer formed after the deposition step has weak adhesion to the substrate as compared to a polymeric film. This adhesion becomes even weaker after EDOT deposition and partial polymerization in the oxidant-containing layer. As a substrate bearing such a PEDOT/oxidant layer is immersed into solvent, especially water, the whole layer can easily peel off, or lift up and drop back to the substrate, forming folds or wrinkles. A wrinkle formed during the washing process is shown in the AFM image of FIG. 1A. The yield of wrinkle free VPP-PEDOT films is very low. It is generally necessary to sacrifice surface morphology in order to ensure that films are maintained intact. The process of the invention removes the necessity for this sacrifice, enabling the production of smooth VPP-PEDOT film that adheres well to the substrate.

In the process of the invention, additive polymers such as PVA and PEO are blended with the typical oxidant layer material before deposition. After PEDOT polymerization, the two polymers PEDOT and PVA or PEO form a matrix containing water soluble and water insoluble polymers on the substrate, which greatly increases adhesion between the oxidant blend layer and the substrate, and the peeling off and wrinkle phenomena are greatly reduced.

The ratio of iron p-toluenesulfonate heptanedionate to PVA/PEO in the solution is important for increasing the adhesion of the prepared films to the substrates. The best ratio of iron p-toluenesulfonate heptanedionate to PVA is between 1:0.042 and 1:0.12. With a further increase or decrease in PVA content the prepared films start to lose adhesion to the substrate or tear off during the water washing step. The PEO additive in the oxidant solution is also very helpful to increase the adhesion of prepared films to the substrates. For an iron p-toluenesulfonate heptanedionate to PEO ratio from 1:0.23 to 1:0.69, all of the prepared films showed good adhesion to the substrate even under harsh washing conditions.

As an example, the AFM image of a VPP-PEDOT film with PVA additive shows no wrinkles (c. f. FIG. 1B). This film was prepared from a solution with an iron p-toluenesulfonate heptanedionate:PVA ratio of 1:0.085, as in solution table 1. The presence of these additives causes strong adhesion of the film to the substrate. This allows the use of a harsher washing method, with water to clean the surface, removing most of the unused oxidant and by-products from the VPP-PEDOT film.

Sheet resistance and transmission are two important parameters for the application of VPP-PEDOT films as transparent electrodes. The additives are totally transparent in the visible range and they therefore do not reduce the transparency of the VPP-PEDOT film.

Figure 2:
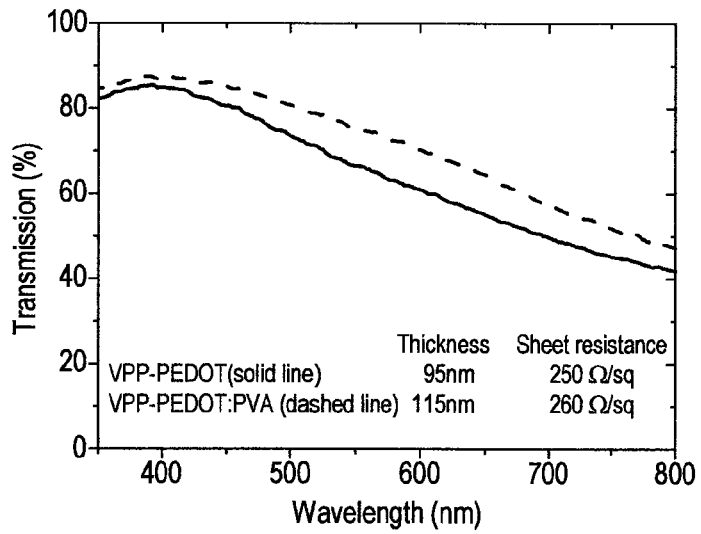
FIG. 2 shows transmission spectra of VPP-PEDOT film (solid line) and VPP-PEDOT with PVA additive (dashed line) prepared with iron p-toluenesulfonate heptanedionate:PVA 1:0.085, as in solution table 1. The thickness and sheet resistance are also shown in the figure.

FIG. 2 shows transmission spectra of a VPP-PEDOT film and a VPP-PEDOT film prepared using the PVA additive from a solution with iron p-toluenesulfonate heptanedionate:PVA 1:0.085, as in solution table 1. The thickness and sheet resistance are also shown in FIG. 2. The transmission of VPP-PEDOT with PVA is 5% higher than that of VPP-PEDOT film, and has similar sheet resistance around 250 ohm per square. This clearly demonstrates the advantages of the invention, an increase in the yield of wrinkle free VPP-PEDOT films with no loss in transmission or degradation in electrical properties. The precise concentration of additive used can be selected, depending on the specific properties desired for the intended application of the PEDOT film.

Example 2

VPP-PEDOT Film with Pin Hole Free Substrate Coverage and High Conductivity

A series of VPP-PEDOT thin films was prepared using the known synthetic route described in example 1, depositing the oxidant layers from an oxidant solution containing 17% iron p-toluenesulfonate heptanedionate and 0.6% pyridine in a toluene and butanol (1:1) solution. There were no polymer additives in the solution. The temperatures for polymerization were varied from 3 to 40° C.

Figure 3:
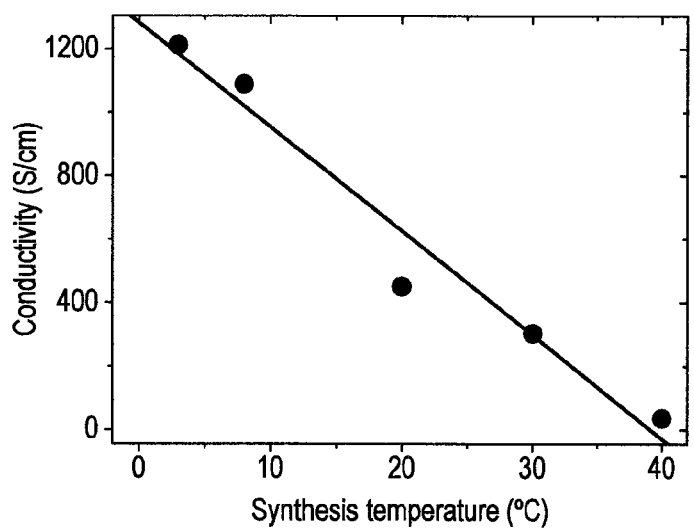
FIG. 3 shows a plot of the conductivity of VPP-PEDOT films vs. synthesis temperature. Synthesis was carried out using a mixed solution containing 17% iron p-toluenesulfonate heptanedionate and 0.6% pyridine in a toluene and butanol (1:1) solution.

The conductivity of the VPP-PEDOT film is considerably increased by reducing the synthesis temperature. The conductivity of VPP-PEDOT film vs synthesis temperature is shown in FIG. 3. The highest conductivity, 1200 S/cm, was obtained at 3° C. It is considered that the high conductivity of VPP-PEDOT films synthesized at low temperature is predominantly due to the low growth rate, which is favorable for the formation of polymer chains with long conjugation lengths. A corresponding trend in increasing conductivity with reduction in polymerization temperature has been observed for VPP-PEDOT formation carried out according to the additive process of the present invention.

The invention claimed is:

1. A process for the production of a polymerized film by vapour phase polymerization (VPP), wherein the film has a conductivity of at least 335 S/cm, the process comprising the steps of:
   (1) providing a solution comprising an oxidant, an amine or amide polymerisation inhibitor and an additive in a solvent, wherein the additive is a water soluble polymer;
   (2) applying the solution to a surface of a substrate so as to form an oxidant, polymerisation inhibitor and additive mixture layer on the surface of the substrate;
   (3) exposing the oxidant, polymerization inhibitor and additive containing layer to a vapourized heteroaromatic monomer and allowing polymerization to proceed to form a polymer film on the surface of the substrate.

2. A process according to claim 1, wherein the solution comprising an oxidant, an amine or amide polymerisation inhibitor and an additive is an aqueous solution.

3. A process according to claim 1, further comprising, following step (2), the step (2a) of removing solvent from the oxidant, polymerisation inhibitor and additive mixture layer.

4. A process according to claim 3, wherein solvent is removed by heating.

5. A process according to claim 1, wherein polymerization step (3) is carried out at a temperature in the range from 40° C. to 3° C.

6. A process according to claim 1 wherein polymerization is carried out in a dry chamber.

7. A process according to claim 1, wherein the process further comprises step (4) of washing the substrate bearing a polymer film as produced in step (3) with water or an aqueous solvent.

8. A process according to claim 1, wherein the process further comprises step (5) of depositing a layer of polymeric acid onto the polymerized film.

9. A process according to claim 8, wherein the polymeric acid is a water soluble polymeric acid.

10. A process according to claim 9, wherein, the polymeric acid is poly (4-styrene sulfonic acid) (PSSA), poly(2-acrylamido-2-methyl-1-propanesulfonic acid) (PAAMPSA) or poly(3,4-ethylenedioxythiophene) doped with poly(4-styrenesulfonate) (PEDOT-PSS).

11. A process according to claim 1, wherein the additive is polyethylene oxide (PEO), polyvinyl alcohol (PVA), polyacrylamide, carboxymethylcellulose, hydroxyethylcellulose or a mixture of polymers comprising 1 or 2 of polyethylene oxide (PEO), polyvinyl alcohol (PVA), polyarcrylamide, carboxymethylcellulose and hydroxyethylcellulose.

12. A process according to claim 1, wherein the additive is polyethylene oxide (PEO) or polyvinyl alcohol (PVA).

13. A process according to claim 1, wherein the polymer film comprises a polymer of a monomer of any of formulae I to V

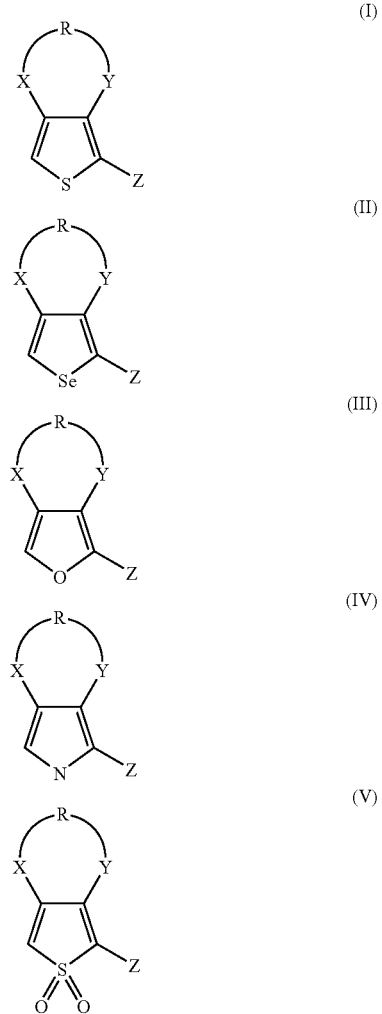

wherein X and Y may be, independently, —O— or —CH$_2$—, with the proviso that at least one of X and Y is —O—; R is optionally substituted C$_{1-4}$ alkyl; and Z is hydrogen or —NH$_2$.

14. A process according to claim 13, wherein X and Y are both —O— and/or wherein Z is hydrogen.

15. A process according to claim 1, wherein the monomer is ethylenedioxythiophene (EDOT) and the polymer film produced by the process of claim 1 is a poly(3,4-ethylenedioxythiophene) (PEDOT) film.

16. A process according to claim 1 wherein the oxidant is an iron (III) salt.

17. A process according to claim 16, wherein the oxidant is an Fe (III) sulphonate, Fe (III) chloride or an Fe(III) phosphate.

18. A process according to claim 16 wherein the oxidant is iron p-toluenesulfonate hexahydrate.

19. A process according to claim 1 wherein the ratio (calculated by weight) between the oxidant and the additive in the oxidant solution is in the range between 1:0.006 and 1:0.92.

20. A process according to claim 1, wherein the additive is PVA and the ratio between oxidant and PVA is in the range between 1:0.042 and 1:0.12 or wherein the additive is PEO and the ratio between oxidant and PEO is in the range between 1:0.23 and 1:0.69.

21. A process according to claim 1 wherein, the additive is PVA and the molecular weight of PVA is 1000-14000 or wherein the additive is PEO and the molecular weight of PEO is at least 1000.

22. A process according to claim 1 wherein the amine or amide polymerization inhibitor is a tertiary amine, a tertiary amide, a cyclic tertiary amine, a cyclic tertiary amide or an aromatic amine.

23. A process according to claim 1 wherein the inhibitor is pyridine.

24. A process according to claim 1 wherein the substrate comprises a polymeric plastic material or a metal foil or glass.

25. A process according to claim 24 wherein the polymeric plastic material is selected from polyolefins, polystyrene, thermoplastics, fluoro-polymers, polyamides and polyvinylchloride.

26. A process according to claim 25 wherein the polymeric plastics material is coated with multilayer barriers comprising SiOx, SiNx or AlOx for reducing the water and oxygen penetration.

27. A process according to claim 1, wherein in step (3) the substrate bearing an oxidant, polymerisation inhibitor and additive-containing layer is exposed to vaporised heteroaromatic monomer in an in vacuo reaction chamber or in a reaction chamber subjected to a gas flow of N$_2$, Ar or dry air.

28. A process according to claim 1, wherein step (3) is carried out at a temperature below 40° C.

29. A process according to claim 1, wherein the solution comprising an oxidant, a polymerisation inhibitor and an additive is an aqueous solution comprising a mixture of solvents, namely water and a water miscible solvent.

30. A process according to claim 1, wherein the oxidant, amine or amide polymerisation inhibitor and an additive are dissolved in a mixture of toluene and an alcohol solvent.

31. A process according to claim 1, wherein the oxidant solution comprises glycol or glycerol.

32. A polymerized film on a substrate produced by the process of claim 1.

33. A process according to claim 4, wherein heating to remove solvent is carried out at 80-120° C. for 1-5 min in a dry atmosphere or under vacuum.

34. A process according to claim 21, wherein the additive is PVA with a molecular weight of 7000-10000.

35. A process according to claim 21, wherein the additive is PEO with a molecular weight of at least 6400.

36. A process according to claim 22, wherein the polymerization inhibitor is selected from the group consisting of 4-methylmorpholine, 1-methyl piperidine, 1-methylpyrrolidone, N-methyl-pyrrolidone, N-vinyl-pyrrolidone, 3-methyl-2-oxozolidone, pyridine, N-methyl-imidazole, quinoline and isoquinoline.

37. A process according to claim 29, wherein the water miscible solvent is an alcohol.

38. A process according to claim 37, wherein the alcohol is methanol, ethanol or butanol.

39. A process according to claim 30, wherein the alcohol solvent is methanol, ethanol or butanol.

40. The method of claim 1, wherein the polymer has a molecular weight of 1000-14000.

41. The method of claim 1, wherein the polymerized film has a transmission of at least 75% at 550 nm.

* * * * *